United States Patent
Ji

(10) Patent No.: US 8,228,785 B2
(45) Date of Patent: Jul. 24, 2012

(54) METHOD FOR CONTENTION-FREE NPD PERIODIC UPDATING

(75) Inventor: Baowei Ji, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1059 days.

(21) Appl. No.: 12/216,156

(22) Filed: Jun. 30, 2008

(65) Prior Publication Data

US 2009/0097460 A1    Apr. 16, 2009

Related U.S. Application Data

(60) Provisional application No. 60/960,744, filed on Oct. 11, 2007, provisional application No. 60/996,619, filed on Nov. 27, 2007.

(51) Int. Cl.
H04J 3/14      (2006.01)
H04L 12/26    (2006.01)
H04B 7/216    (2006.01)

(52) U.S. Cl. ........ 370/217; 370/221; 370/335; 370/342; 370/441

(58) Field of Classification Search ................. 370/217, 370/221, 335, 342, 441; 709/220, 221; 714/749, 714/752
See application file for complete search history.

(56) References Cited

U.S. PATENT DOCUMENTS

| 6,665,311 | B2* | 12/2003 | Kondylis et al. ............. 370/462 |
| 7,684,428 | B2* | 3/2010 | Habetha et al. .............. 370/443 |
| 7,720,086 | B2* | 5/2010 | Wu et al. ....................... 370/436 |
| 7,830,838 | B2* | 11/2010 | Kohvakka et al. ........... 370/330 |
| 7,965,632 | B2* | 6/2011 | Sugaya ......................... 370/231 |
| 2005/0013267 | A1 | 1/2005 | An |
| 2006/0164290 | A1 | 7/2006 | Dawson |
| 2007/0274206 | A1* | 11/2007 | Habetha et al. ............. 370/222 |
| 2008/0010208 | A1* | 1/2008 | Callaway ...................... 705/57 |

OTHER PUBLICATIONS

Zhongding Lei et al., "A Reliable and Power Efficient Beacon Structure for Cognitive Radio Systems", IEEE Transactions on Broadcasting, IEEE Service Center, Piscataway, NY, US, vol. 54, No. 2, Jun. 1, 2008, ISSN: 0018-9316, pp. 182-187.*

International Search Report issued on Apr. 15, 2009 in connection with International Patent Application No. PCT/KR2008/005865.

IEEE 802.22.1 Standard for Information technology, Telecommunications and information exchange between systems, Local and metropolitan area networks, Specific requirements, Part 22.1: Enhanced Protection for Low-Power, Licensed Devices Operating in Television Broadcast Bands, P802.22.1/D2, Oct. 2007.

* cited by examiner

Primary Examiner — Alpus H Hsu

(57) ABSTRACT

Methods and apparatus for a next-in-line protecting device to periodically broadcasting its existence in a communication system. A next-in-line protecting device periodically transmits the next-in-line codeword to inform a primary protecting device and a plurality of secondary devices that the next-in-line device still exists in a communication system. The NPD transmits the NPD codeword intelligently in order to reduce the probability of collision with the RTS codewords transmitted by the other SPDs.

18 Claims, 5 Drawing Sheets

METHOD FOR CONTENTION-FREE NPD PERIODIC UPDATING

CLAIM OF PRIORITY

This application makes reference to, incorporates the same herein, and claims all benefits accruing under 35 U.S.C. §119 from provisional applications earlier filed in the U.S. Patent & Trademark Office on 11 Oct. 2007 and there duly assigned Ser. No. 60/960,744, and on 27 Nov. 2007 and there duly assigned Ser. No. 60/996,619, respectively.

BACKGROUND OF THE INVENTION

1. Field of the Invention

The present invention relates to methods and apparatus for a next-in-line protecting device to periodically broadcast its existence in a communication system.

2. Description of the Related Art

The present invention incorporates by reference the Institute of Electrical and Electronics Engineers (IEEE) 802.22.1 Standard for Information technology: "*Telecommunications and information exchange between systems—Local and metropolitan area networks—Specific requirements, Part 22.1: Enhanced Protection for Low-Power, Licensed Devices Operating in Television Broadcast Bands*".

IEEE 802.22.1 defines a beacon network including beaconing devices that offer enhanced protection for low power, licensed devices, such as wireless microphones, operating in television broadcast bands. The beacon network is constructed with a plurality of protecting devices. A protecting device (PD) is a beaconing device that is protecting a low-power, licensed device. The protecting device may be either the primary protecting device (PPD) or a secondary protecting device (SPD). A primary protecting device (PPD) is a device that uses periodic beacons to protect its corresponding licensed device, and its protection may be extended to other licensed devices in the area. A secondary protecting device (SPD) is a device that shares the responsibility of protecting its corresponding licensed device with the PPD. An SPD occasionally sends beacons for communicating with the PPD. A next-in-line protecting device (NPD) is an SPD that will be the first candidate to become a PPD in the event that the already existing PPD ceases operation. For the convenience of description, a cluster is defined as one PPD together with all the SPDs and the NPD whose information has been aggregated, or to be aggregated into the PPD's beacon frame.

In the IEEE 802.22.1 drafts v1.0 and v2.0, a method is defined for the NPD to periodically broadcast its existence. The NPD shall transmit the NPD codeword at least once every ten superframes (a constant parameter called aNPDPeriod). A MLME-NPD-LOST.indication primitive is generated by a medium access control (MAC) sublayer management entity (MLME) of the PPD or an SPD in the cluster and issued to its next higher layer as a notification that the MLME has not received either an NPD beacon frame or the NPD codeword within the last fifty superframes. In this way, the next higher layer is informed of the abnormal operation of the NPD so that the PPD and the SPDs could take proper actions.

In the current IEEE802.22.1 draft, whenever an SPD or the NPD wants to transmit a beacon frame to the PPD, the SPD or the NPD should first transmit a request-to-send (RTS) codeword at the receiving period of a superframe. If the SPD or the NPD receives the corresponding acknowledgement message (ACK) from the PPD, the SPD or the NPD will transmit the beacon frame at the next superframe. The SPDs and the NPD, however, shall avoid meaningless contention. Namely, the SPDs and the NPD shall not contend to send RTS codewords if the PPD is not transmitting its beacon frame in the current superframe. Otherwise, it is guaranteed that the PPD will ignore any request from the NPD and SPDs. This is because the PPD has to transmit its beacon frame at least once every other superframe, thus, the PPD cannot honor any contention.

In contemporary transmissions, it has long been the inviolate custom followed in order to preserve the allocation of time and frequency resources, for the next-in-line protecting device to wait until its internal timer expires, and only after the expiration of its internal timer, does the next-in-line protecting device transmit the NPD codeword. I have discovered that this contemporary transmission practice is not an efficient use of the allocation of time and frequency resources.

In other words, contemporary practice requires that the NPD shall not transmit when the PPD has not sent NACK in the last superframe. The disadvantage of the contemporary practice is that the periodic transmission of the NPD codeword by the NPD increases the probability of collision between the transmissions from the NPD and the SPDs. The collision events could result in many undesirable consequences. Firstly, the SPDs and the PPD are likely to conclude by mistake that the NPD has disappeared if all of the five attempts of the NPD transmission have failed in the last 50 superframes. Secondly, the collision wastes the opportunity for an SPD to transmit its beacon information timely. Thirdly, the collision may prohibit an SPD from sending a beacon frame timely, which in turn could make the PPD to believe the SPD has disappeared abnormally.

SUMMARY OF THE INVENTION

It is therefore an object of the present invention to provide an improved method and beacon network for protecting licensed devices.

It is another object of the present invention to provide an improved method and apparatus to periodically updating an existence of a next-in-line protecting device, while avoiding meaningless contention between the next-in-line protecting device and secondary protecting devices.

In one aspect of the present invention, a next-in-line protecting device (NPD) periodically transmits the NPD codeword to inform a primary protecting device and a plurality of secondary devices that the next-in-line device still exists in a communication system, in regardless of whether the primary protecting device has transmitted any non-acknowledgement message in an immediately previous superframe or not.

The next-in-line protecting device first makes a determination regarding whether a periodic update timer will expire in two superframes. Note that number "two" is used as a design reference herein, other numbers could be implemented if desired. When the periodic update timer will expire in two superframes, the next-in-line protecting device determines whether the periodic update timer has expired in the current superframe. When the periodic update timer has expired in the current superframe, next-in-line protecting device transmits a next-in-line codeword, and restarting the periodic update timer. When the periodic update timer has not expired in the current superframe, the next-in-line protecting device determines whether a non-acknowledgement message has been received from the primary protecting device in the immediately previous superframe. When the non-acknowledgement message has been received from the primary protecting device in the immediately previous superframe, the next-in-line protecting device defers the transmission of the next-in-line codeword. Otherwise, when the non-acknowledgement message has not been received at the next-in-line protecting device from the primary protecting device in the immediately previous superframe, the next-in-line protecting device transmits the next-in-line codeword and restarts the periodic update timer.

In addition, the primary protecting device has to transmit a beacon frame at least in every other superframe, and typically transmits a non-acknowledgement message in each one of the superframes that immediately proceed the superframes during which the beacon frame is transmitted at the primary protecting device.

Moreover, the next-in-line protecting device determines whether it is possible that any of other secondary protecting devices could transmit a request-to-send message in the current superframe. When the next-in-line protecting device determines that at least one secondary protecting device may transmit a request-to-send message, the next-in-line protecting device will try to defer the transmission of the next-in-line codeword.

According to another aspect of the present invention, none of the secondary protecting devices transmits any request-to-send message in a superframe when the primary protecting device has not transmitted any non-acknowledgement message in the immediately previous superframe.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
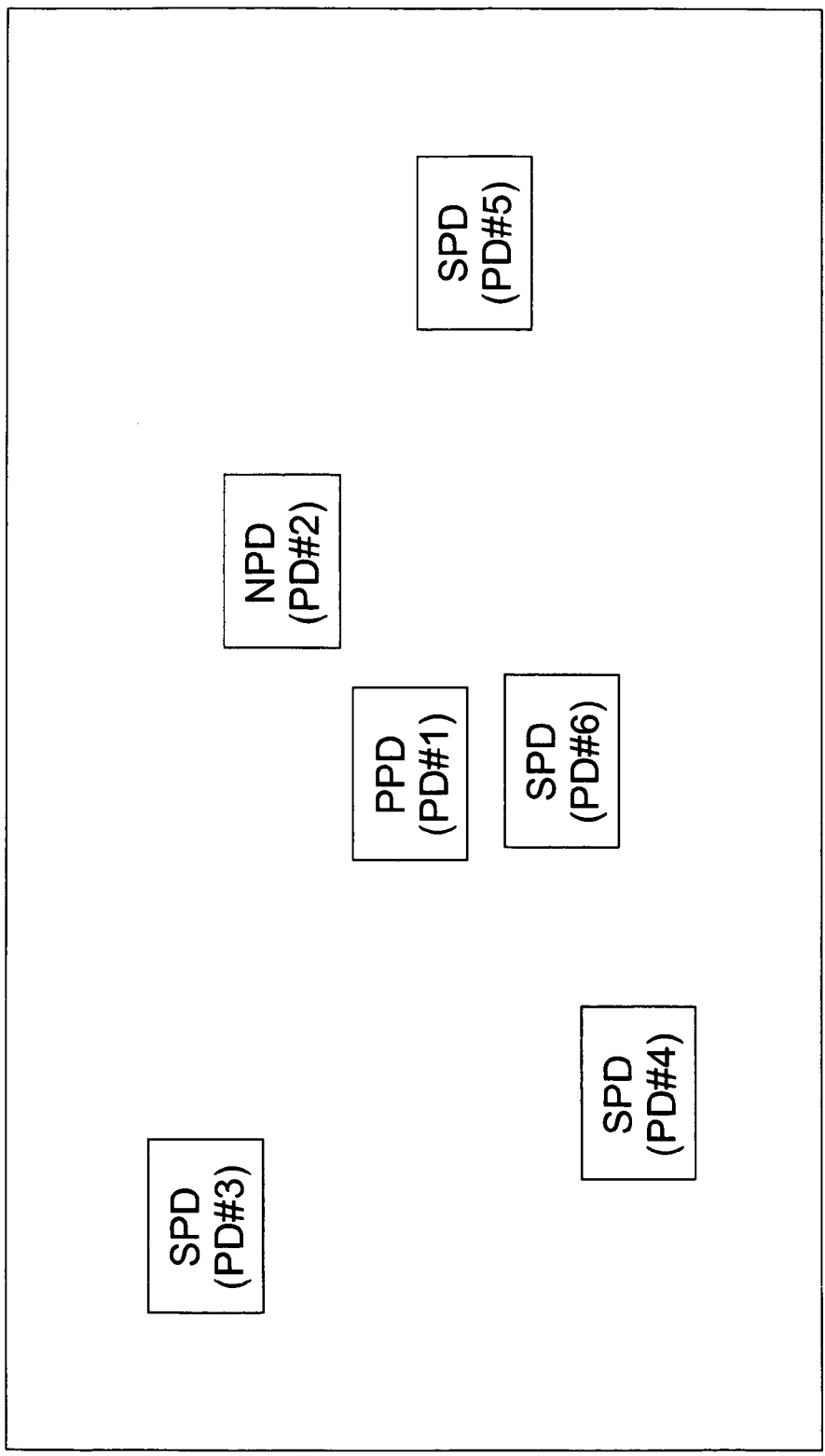
FIG. 1 schematically illustrates a cluster of protecting devices in a communication system in which various embodiments of the present disclosure may be implemented.

IEEE 802.22.1 defines a beacon network including beaconing devices that offer enhanced protection for low power, licensed devices, such as wireless microphones, operating in television broadcast bands. The beacon network is constructed with a plurality of protecting devices. A protecting device (PD) is a beaconing device that is protecting a low-power, licensed device. The protecting device may be either the primary protecting device (PPD) or a secondary protecting device (SPD). A primary protecting device (PPD) is a device that uses periodic beacons to protect its corresponding licensed device, and its protection may be extended to other licensed devices in the area. A secondary protecting device (SPD) is a device that shares the responsibility of protecting its corresponding licensed device with the PPD. An SPD occasionally sends beacons for the sole purpose of communicating with the PPD. A next-in-line protecting device (NPD) is an SPD that will become a PPD in the event that the already existing PPD stops transmitting periodic beacon frames. A cluster is defined as one PPD together with all the SPDs and the NPD whose information has been aggregated, or to be aggregated into the PPD's beacon frame. FIG. 1 schematically illustrates a cluster of protecting devices, in which various embodiments of the present disclosure may be implemented, where PD #1 is the PPD, PD #2 is the NPD, and PDs #3-6 are the SPDs.

Figure 2:
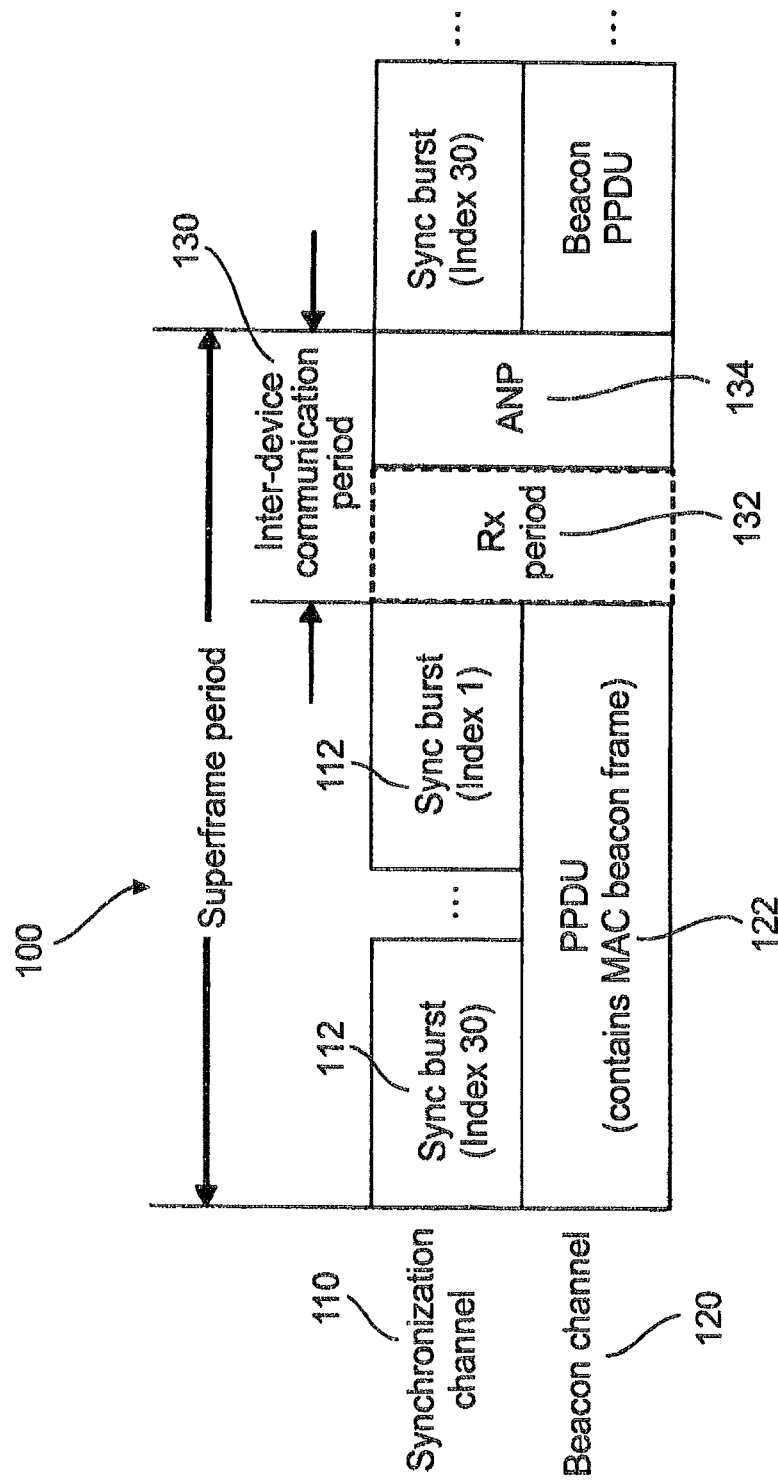
FIG. 2 schematically illustrates a structure of a superframe.

The current IEEE 802.22.1 standard employs a superframe structure as shown in FIG. 2. Superframe 100 consists of a succession of thirty-one slots. Each slot is comprised of thirty-two differential quadrature phase-shift keying (DQPSK) symbols, where one symbol has a duration of 1/9609.1 seconds. The superframe structure is comprised of two logical channels continuously transmitted in parallel. The first logical channel is synchronization channel 110. The second logical channel is beacon channel 120. The synchronization channel consists of a succession of synchronization bursts 112. The beacon channel consists of physical layer (PHY) protocol data unit (PPDU) 122, which contains the medium access control sublayer (MAC) beacon frame. Each slot contains one synchronization burst, as well as a fixed number of PPDU bits. Under the control of an upper layer, an inter-device communication period 130 may also be included in a superframe period. This format repeats on the television (TV) channel without interruption as long as at least one protecting device is in operation. Note that the synchronization bursts and PPDU may be sent by either a PPD or an SPD.

Synchronization bursts 112, each of which consists of a synchronization word followed by a decrementing index value, enable any receiver asynchronously sampling the beacon channel to quickly determine when the next beacon will be sent. Parity bits follow the index value and provide error detection and correction on the index value.

PPDU 122 consists largely of the MAC beacon frame. The MAC beacon frame contains information relevant to the device or devices protected by the protecting device, including the physical location of the beaconing device and the estimated duration of TV channel occupancy.

Following thirty synchronization bursts and the PPDU, there is an optional inter-device communication period 130, composed of a receive (Rx) period 132, during which the PPD pauses to monitor the TV channel for a request to send (RTS) burst transmitted by an SPD, and an acknowledgement or non-acknowledgement period (ANP) 134, during which an ANP burst shall be transmitted reflecting whether an RTS burst was detected. During the initial transmission period of the PPD, no inter-device communication period will follow.

All transmissions are broadcast. Transmitted data may be received and processed by any device in the area, including WRAN devices and other IEEE 802.22.1-compliant devices.

Two types of data transfer transactions exist for an IEEE 802.22.1-compliant device. The first type is the data transfer from the PPD to an SPD, in which the PPD transmits the data. The second type is the data transfer from an SPD to the PPD, in which the SPD transmits the data.

Figure 3:
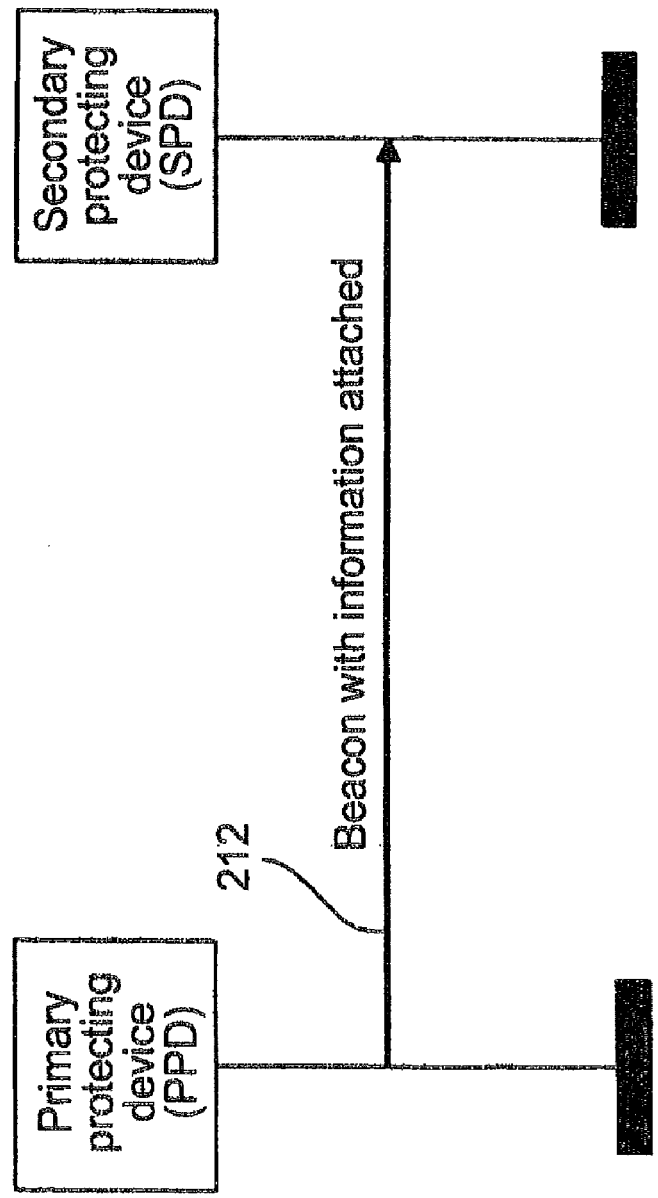
FIG. 3 schematically illustrates a communication scheme from a primary protecting device to a secondary protecting device.

FIG. 3 schematically illustrates the communication from a PPD to a SPD. When the PPD desires to send data to an SPD, the PPD does so by placing the information in its beacon PHY service data unit (PSDU) (step 212). The SPD, which may be one of many in range of the PPD, monitors the beacon PSDU of the PPD, and decodes its address and recovers the message. No acknowledgement of data reception is provided at the MAC level.

Figure 4:
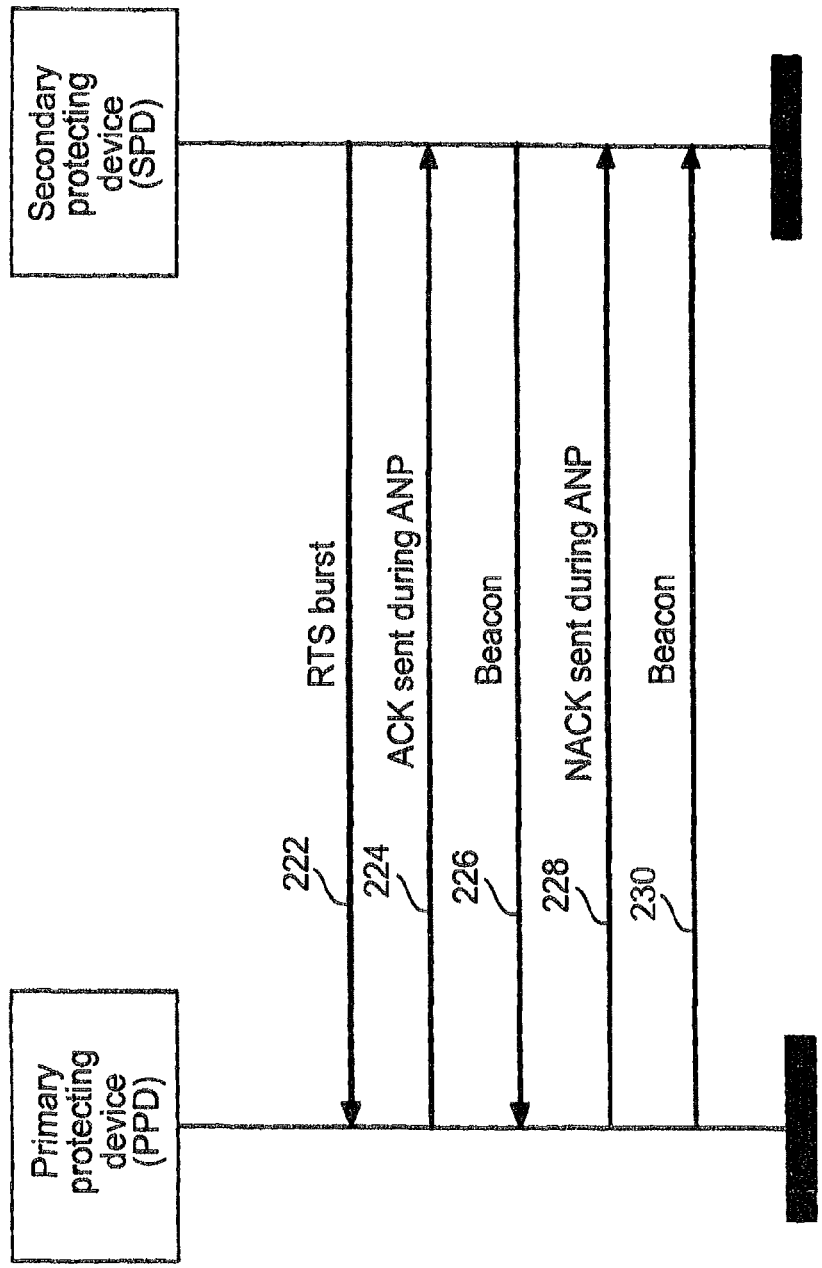
FIG. 4 schematically illustrates a communication scheme from a secondary protecting device to a primary protecting device.

FIG. 4 schematically illustrates the communication from a SPD to a PPD. When an SPD desires to send data to the PPD, the SPD first sends an RTS burst to the PPD during the receive period of the superframe (step 222). When the PPD receives the RTS burst, the PPD may send an ACK corresponding to the detected RTS codeword during the ANP (step 224). Assuming the PPD sends an ACK, the PPD then yields the following superframe to the SPD, which then transmits its own superframe, containing its data and the synchronization channel, during this time (step 226). Following the transmission by the SPD, the PPD continues the superframe by monitoring the radio channel during the receive period. The PPD then sends a NACK during the subsequent ANP (step 228), since the PPD is required to transmit at least every other beacon frame, and resumes transmitting beacon frames (step 230). If the SPD sends an RTS burst to the PPD during the receive period of the superframe at step 222 and does not receive an ACK during the ANP, the SPD shall not send a beacon frame.

In the current IEEE 802.22.1 draft, a method is defined for the NPD to periodically broadcast its existence by transmitting the NPD codeword. The NPD shall transmit the request-to-send (RTS) code at least once every ten superframes (a constant parameter called aNPDPeriod). A MLME-NPD-LOST.indication primitive is generated by a MAC sublayer management entity (MLME) of the PPD or an SPD in the cluster and is issued to the next higher layer if MLME as a notification that the MLME has not received either an NPD beacon frame or the NPD codeword within the last fifty superframes. In this way, the next higher layer is informed of the abnormal operation of the NPD so that the PPD and the SPDs could take proper actions.

In the current IEEE802.22.1 draft, the SPDs and the NPD shall avoid meaningless contention. Namely, the SPDs and the NPD shall not contend to send RTS codewords if the PPD is not transmitting its beacon frame in the current superframe. Otherwise, it is guaranteed that the PPD will ignore any request from the NPD and SPDs. This, again, is because the PPD has to transmit its beacon frame in the next superframe, thus, the PPD cannot honor any contention.

In other words, the prior art requires that the NPD shall not transmit when the PPD has not sent NACK in the last superframe. The disadvantage of the prior art is that the periodic transmission of the NPD codeword by the NPD increases the probability of collision between the transmissions from the NPD and the SPDs. The collision events could result in many undesirable consequences. Firstly, the SPDs and the PPD could conclude by mistake that the NPD has disappeared if all the five attempts of the NPD transmission have failed in the last 50 superframes. Secondly, the collision wastes the opportunity for a SPD to transmit its beacon information timely. Thirdly, the collision may prohibit an SPD from sending a beacon frame timely, which in turn could make the PPD to believe the SPD has disappeared abnormally.

In this invention the periodic update of the NPD is treated differently because of the uniqueness of the NPD codeword. In a first embodiment according to the principles of the present invention, to the contrary to the prior art, the NPD shall try to send the NPD codeword when the PPD has not sent NACK in the last superframe, i.e., the PPD does not transmit its beacon frame in the current superframe. Even though the PPD will definitely deny any request from other protecting devices so that that the PPD can send its beacon frame in the next superframe, the uniqueness of the NPD codeword still broadcasts its existence and satisfying the purpose of NPD periodic update. This will guarantee that only the NPD is transmitting at that Rx period, which is free of collision. Moreover, the NPD will try to avoid sending its codeword at the Rx periods when other SPDs may also send their RTS codeword, which reduces the potential collisions. Though unlikely, it could occur that the PPD has continuously sent NACK in a large number of consecutive superframes, in which case the NPD shall send the NPD codeword if its periodic timer expires. In other words, when the PPD has continuously transmitted NACK during a large number of consecutive superframes, and the NPD's periodic update timer expires, and the other SPDs have transmit their RTS codewords in the current superframe, the NPD will still transmit the NPD codeword at the receiving period in the current superframe, even through the NPD codeword may collide with the RTS codewords transmitted by the other SPDs. Note that the PPD has to transmit a beacon frame every other superframe. The PPD also has to transmit a NACK or ACK or Go-On in the ANP period of every superframe. These two conditions together means that the PPD will transmit NACKs at least every other superframes. If the PPD transmits NACK in a large number of consecutive superframes, the PPD will transmit its own beacon frames in all those superframes. This case could happen, but is not common because the PPD should send ACK or Go-On once a while and allow an SPD or the NPD to send beacon frame to the PPD.

In a second embodiment according to the principles of the present invention, an SPD shall never send an RTS burst if the PPD has not sent NACK in the last ANP period. Note that, in the prior art, an SPD sends its first RTS burst without considering what the PPD has sent in the last ANP period.

In order to gain permission to transmit a beacon frame, an SPD transmits an RTS burst. If the PPD has sent NACK in the last ANP period, the MLME of the SPD generates the PLME-INITIATE-RTS-BURST.request message so that the PHY layer management entity (PLME) shall send the RTS burst in the Rx period of the current superframe. Otherwise, the MLME defers and shall not generate the PLME-INITIATE-RTS-BURST.request message unless the PPD has sent NACK in the last ANP period. When the NPD has a beacon frame to transmit, it shall go through the same procedure including the re-try procedure as specified in IEEE 802.22.1 standard.

Figure 5:
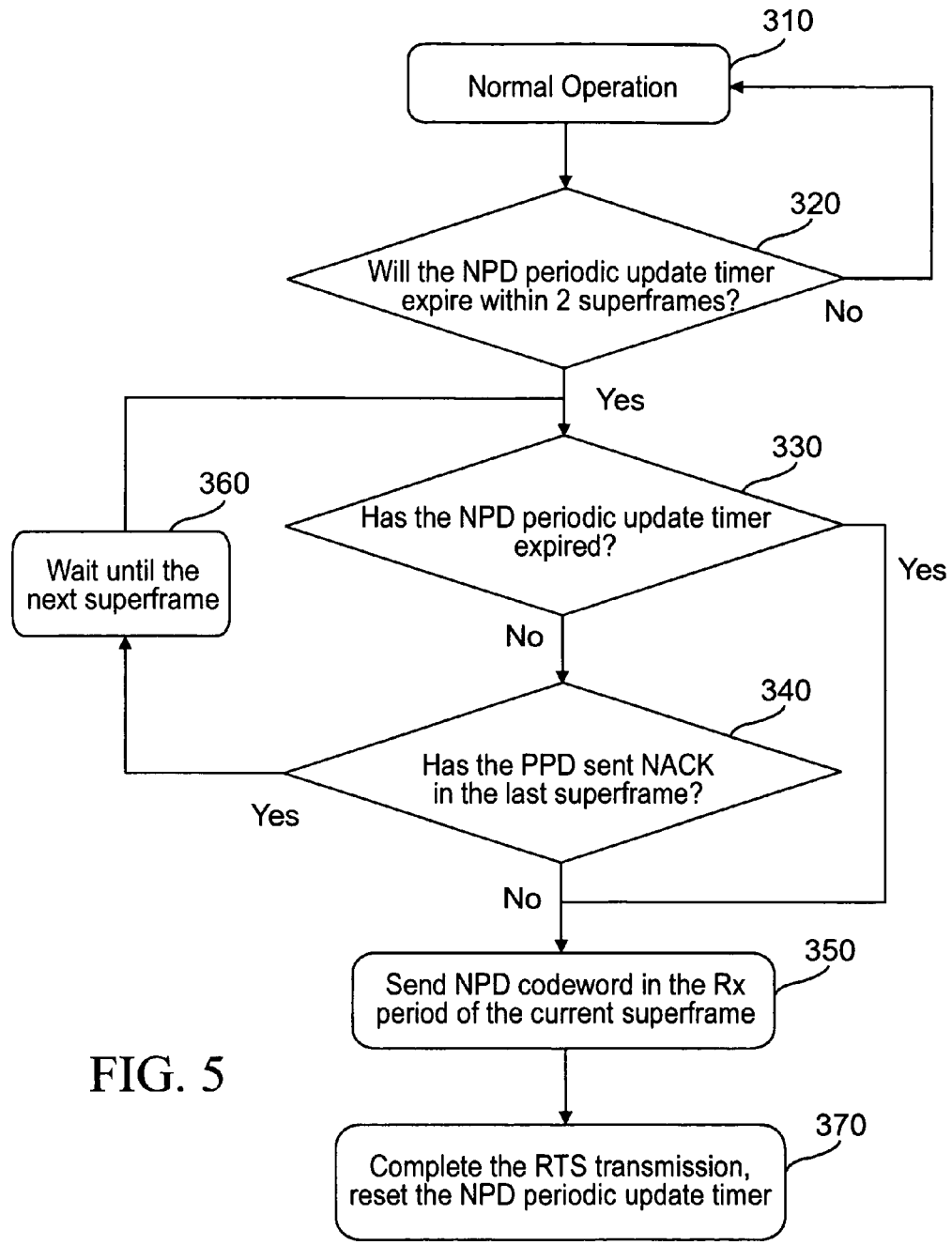
FIG. 5 schematically illustrates operational steps for a next-in-line protecting device to transmit the next-in-line codeword in accordance with an embodiment of the principles of the present invention.

The periodic update of the NPD, however, shall be treated differently because of the uniqueness of the NPD codeword. As shown in FIG. 5, the NPD starts the NPD codeword transmission procedure when its periodic update timer is about to expire within two superframes. Specifically, the NPD determines whether the NPD periodic update time expires within two superframes (step 320). If the NPD periodic update time does not expire, the NPD will go back to normal operation (step 310). Otherwise, the NPD determines whether the NPD periodic update timer expires right now (step 330). If the NPD period update timer does not expire, the NPD determines whether the PPD has transmitted an NACK message in the last superframe (step 340). If the PPD has not sent NACK in the last ANP period, the MLME of the NPD shall generate a PLME-NPD-HEARTBEAT.request message so that the PLME shall send the NPD codeword in the Rx period of the current superframe (step 350). Otherwise, the NPD defers to the next superframe if the NPD periodic update timer has not expired yet (step 360). When the NPD determines that the NPD period update timer expires at step 330, the NPD shall send the NPD codeword no matter whether the PPD has sent NACK in the last ANP period or not (step 350). After the NPD transmits the NPD codeword, the NPD completes the RTS transmission and resets the NPD period update timer (step 370).

If the PPD detects an RTS burst from an SPD and has decided to reserve the upcoming superframe for that SPD, the PPD shall transmit the ACK corresponding to the received RTS codeword during the ANP. The PPD shall then enable the receiver of the PPD for a period of one slot. If, during this time, the beacon frame of the SPD is detected, the receiver shall remain on, and the beacon frame shall be received and passed to the next higher layer via a MLME-INCOMING-BEACON.indication primitive. Immediately following the beacon frame reception (and following the one-slot period, if a beacon frame is not detected), the receiver shall remain enabled through the receive period, where the PPD again listens for an RTS burst. Only the NPD could send the NPD codeword during the Rx period following another SPD's beacon frame. The PPD shall transmit a NACK during the ANP no matter what it has received in the Rx period, in order to ensure that at least every other beacon frame is transmitted by the PPD. Nonetheless, the PPD and other SPDs are still informed of the existence of the NPD if the NPD codeword is received during this ANP period because of the uniqueness of the codeword.

Therefore, according to the principles of the present invention, the NPD transmits the NPD codeword intelligently in order to reduce the probability of collision with the RTS codewords transmitted by the other SPDs. Specifically, in contemporary transmissions, it has long been the inviolate custom followed in order to preserve the allocation of time and frequency resources, for the next-in-line protecting device to wait until its internal timer expires, and only after the expiration of its internal timer, does the next-in-line protecting device transmit the NPD codeword. I have discovered that this contemporary transmission practice is not an efficient use of the allocation of time and frequency resources. In the practice of the principles of the present invention, I have found that a more efficient use of the allocation of time and frequency resources may be attained if the NPD starts to prepare for transmitting NPD codeword two (2) superframes before the timer expires, and tries to send the NPD codeword when it is guaranteed no other SPDs is transmitting RTS codewords. This mechanism avoids or at least minimizes collisions.

While the present invention has been shown and described in connection with the preferred embodiments, it will be apparent to those skilled in the art that modifications and variations can be made without departing from the spirit and scope of the invention as defined by the appended claims.

What is claimed is:

1. A method for providing protection in a communication system, the method comprising:
   determining whether a periodic update timer will expire in a certain number of superframes; and
   responsive to determining that the periodic update timer will expire in the certain number of superframes, determining whether the periodic update timer has expired in a current superframe,
   responsive to determining that the periodic update timer has expired in the current superframe, determining, at a next-in-line protecting device, whether a non-acknowledgement message has been received from a primary protecting device in an immediately previous superframe, wherein the communication system includes a plurality of protecting devices protecting a number of licensed devices and wherein the plurality of protecting devices comprises the primary protecting device, a number of secondary protecting devices, and the next-in-line protecting device; and
   responsive to determining that the non-acknowledgement message has not been received from the primary protecting device in the immediately previous superframe, transmitting, at the next-in-line protecting device, a next-in-line protecting device (NPD) codeword to inform other protecting devices in the plurality of protecting devices that the next-in-line protecting device still exists in the communication system.

2. The method of claim 1 further comprising:
   responsive to determining that the non-acknowledgement message has been received from the primary protecting device in the immediately previous superframe, deferring transmitting, at the next-in-line protecting device, the next-in-line codeword in a current superframe.

3. The method of claim 1 further comprising:
   responsive to determining that the periodic update timer has expired in the current superframe, transmitting the next-in-line codeword and restarting the periodic update timer.

4. A method for providing protection in a communication system, the method comprising the steps of:
   providing a plurality of protecting devices protecting a plurality of licensed devices, with the plurality of protecting devices comprising a primary protecting device, a plurality of secondary protecting devices, and a next-in-line protecting device; and
   making a determination at the next-in-line protecting device regarding whether a periodic update timer will expire in a certain number of superframes;
   when the periodic update timer will expire in the certain number of superframes, making a determination at the next-in-line protecting device regarding whether the periodic update timer has expired in a current superframe;
   when the periodic update timer has expired in the current superframe, transmitting a next-in-line codeword at the next-in-line protecting device, and restarting the periodic update timer; and
   when the periodic update timer has not expired in the current superframe, making a determination at the next-in-line protecting device regarding whether a non-acknowledgement message has been received from the primary protecting device in an immediately previous superframe, and:
      when the non-acknowledgement message has been received at the next-in-line protecting device from the primary protecting device in the immediately previous superframe, deferring transmission of the next-in-line codeword; and
      when the non-acknowledgement message has not been received at the next-in-line protecting device from the primary protecting device in the immediately previous superframe, transmitting the next-in-line codeword at the next-in-line protecting device, and restarting the periodic update timer.

5. The method of claim 4 further comprising:
   transmitting, at the primary protecting device, a beacon frame in at least every other superframe; and
   typically transmitting, at the primary protecting device, a non-acknowledgement message in each one of the superframes that immediately proceed superframes during which the beacon frame is transmitted at the primary protecting device.

6. The method of claim 4, wherein none of the secondary protecting devices transmit any request-to-send message in a superframe when the primary protecting device has not transmitted any non-acknowledgement message in the immediately previous superframe.

7. The method of claim 4 further comprising:
   determining, at the next-in-line protecting device, whether it is possible for any of the secondary protecting devices to transmit a request-to-send message; and when the next-in-line protecting device determines that it is possible that at least one secondary protecting devices may transmit a request-to-send message, trying to defer transmission of the next-in-line codeword at the next-in-line protecting device.

8. A communication system, comprising:
a plurality of protecting devices configured to protect a number of licensed devices, wherein the plurality of protecting devices comprises a primary protecting device, a number of secondary protecting devices, and a next-in-line protecting device, wherein the next-in-line protecting device is configured to:
  determine whether a periodic update timer will expire in a certain number of superframes; and
  determine, in response to determining that the periodic update timer will expire in the certain number of superframes, whether the periodic update timer has expired in a current superframe,
  determine, in response to determining that the periodic update timer has not expired in the current superframe, whether a non-acknowledgement message has been received from the primary protecting device in an immediately previous superframe; and
  transmit, in response to determining that the non-acknowledgement message has not been received from the primary protecting device in the immediately previous superframe, a next-in-line codeword to inform other protecting devices in the plurality of protecting devices that the next-in-line protecting device still exists in the communication system.

9. The communication system of claim 8, wherein the next-in-line protecting device is further configured to:
  transmit, in response to determining that the periodic update timer has expired in the current superframe, the next-in-line codeword, and restart the periodic update timer; and
  defer, in response to determining that the non-acknowledgement message has been received at the next-in-line protecting device from the primary protecting device in the immediately previous superframe, transmission of the next-in-line codeword.

10. The communication system of claim 9, wherein the primary protecting device is configured to:
  transmit a beacon frame in at least every other superframe; and
  typically transmit a non-acknowledgement message in each one of the superframes that immediately proceed superframes during which the beacon frame is transmitted at the primary protecting device.

11. The communication system of claim 9, wherein none of the secondary protecting devices transmit any request-to-send message in a superframe when the primary protecting device has not transmitted any non-acknowledgement message in the immediately previous superframe.

12. The communication system of claim 8, wherein the next-in-line protecting device is further configured to:
  determine whether it is possible for any of the secondary protecting devices to transmit a request-to-send message; and
  try, in response to determining that it is possible that at least one secondary protecting devices will transmit a request-to-send message, to defer transmission of the next-in-line codeword.

13. An apparatus comprising:
a next-in-line protecting device configured to:
  determine whether a periodic update timer will expire in a certain number of superframes;
  determine, in response to determining that the periodic update timer will expire in the certain number of superframes, whether the periodic update timer has expired in a current superframe;
  determine, in response to determining that the periodic update timer has not expired in the current superframe, whether a non-acknowledgement message has been received from a primary protecting device in an immediately previous superframe; and
  transmit, in response to determining that the non-acknowledgement message has not been received from the primary protecting device in the immediately previous superframe a next-in-line codeword indicating an existence of the next-in-line protecting device in a communication system comprising a primary protecting device, the next-in-line protecting device, a number of secondary protecting devices configured to protect a number of licensed devices.

14. The apparatus of claim 13, wherein the next-in-line protecting device is further configured to:
  transmit, in response to determining that the periodic update timer has expired in the current superframe, the next-in-line codeword, and restart the periodic update timer; and
  defer, in response to determining that the non-acknowledgement message has been received at the next-in-line protecting device from the primary protecting device in the immediately previous superframe, transmission of the next-in-line codeword.

15. The apparatus of claim 13, wherein the next-in-line protecting device is further configured to:
  determine whether it is possible for any of the secondary protecting devices to transmit a request-to-send message; and
  try, in response to determining that it is possible that at least one secondary protecting devices will transmit a request-to-send message, to defer transmission of the next-in-line codeword.

16. The apparatus of claim 13, wherein the next-in-line protecting device is further configured to:
  defer, in response to determining that the non-acknowledgement message has been received at the next-in-line protecting device from the primary protecting device in the immediately previous superframe, transmission of the next-in-line codeword in a current superframe.

17. A method for providing protection in a communication system, the method comprising:
  determining whether the periodic update timer will expire in a certain number of superframes;
  responsive to determining that the periodic update timer will expire in the certain number of superframes, determining whether the periodic update timer has expired in a current superframe,
  responsive to determining that the periodic update timer has expired in the current superframe, determining, at a next-in-line protecting device, whether a non-acknowledgement message has been received from a primary protecting device in an immediately previous superframe, wherein the communication system includes a plurality of protecting devices protecting a number of licensed devices and wherein the plurality of protecting devices comprises the primary protecting device, a number of secondary protecting devices, and the next-in-line protecting device;
  responsive to determining that the non-acknowledgement message has not been received from the primary protecting device in the immediately previous superframe, transmitting, at the next-in-line protecting device, a next-in-line codeword indicating that the next-in-line protecting device still exists in the communication system in a receiving period of the current superframe when a periodic timer expires; and responsive to determining that the non-acknowledgement message has been received from the primary protecting device in the immediately previous superframe, deferring transmitting, at the next-in-line protecting device, the next-in-line codeword in the current superframe.

18. The method of claim 17 further comprising:

responsive to determining that the periodic update timer has expired in the current superframe, transmitting the next-in-line codeword and restarting the periodic update timer.

* * * * *